US007552033B1

(12) United States Patent
Culp et al.

(10) Patent No.: US 7,552,033 B1
(45) Date of Patent: Jun. 23, 2009

(54) SYSTEM AND METHOD FOR DIAGNOSTICALLY EVALUATING ENERGY CONSUMPTION SYSTEMS AND COMPONENTS OF A FACILITY

(75) Inventors: Charles H. Culp, College Station, TX (US); David E. Claridge, College Station, TX (US); Jeffrey S. Haberl, College Station, TX (US); William D. Turner, College Station, TX (US); Mingsheng Liu, Omaha, NE (US)

(73) Assignee: The Texas A&M University System, College Station, TX (US)

( * ) Notice: Subject to any disclaimer, the term of this patent is extended or adjusted under 35 U.S.C. 154(b) by 1980 days.

(21) Appl. No.: 10/027,943

(22) Filed: Dec. 20, 2001

(51) Int. Cl.
*G06F 17/10* (2006.01)
(52) U.S. Cl. .............................. 703/2; 700/291; 705/412
(58) Field of Classification Search ...................... 703/2; 700/291, 295; 705/412
See application file for complete search history.

(56) References Cited

U.S. PATENT DOCUMENTS

| | | | | |
|---|---|---|---|---|
| 5,115,967 A | * | 5/1992 | Wedekind | 236/46 R |
| 5,216,623 A | | 6/1993 | Barrett et al. | 364/550 |
| 5,566,084 A | * | 10/1996 | Cmar | 700/276 |
| 5,651,264 A | | 7/1997 | Lo et al. | 62/230 |
| 5,852,560 A | * | 12/1998 | Takeyama et al. | 700/97 |
| 6,014,716 A | | 1/2000 | Ohara | 710/14 |
| 6,088,688 A | | 7/2000 | Crooks et al. | 705/412 |
| 6,178,362 B1 | | 1/2001 | Woolard et al. | 700/295 |
| 6,216,956 B1 | | 4/2001 | Ehlers et al. | 236/47 |
| 6,366,889 B1 | | 4/2002 | Zaloom | 705/7 |
| 6,439,469 B1 | * | 8/2002 | Gruber et al. | 237/8 R |
| 6,577,962 B1 | | 6/2003 | Afshari | 702/61 |
| 6,785,592 B1 | * | 8/2004 | Smith et al. | 700/291 |
| 2003/0061091 A1 | | 3/2003 | Amaratunga et al. | 705/10 |

OTHER PUBLICATIONS

U.S. Appl. No. 10/004,988, filed Dec. 3, 2001. Inventors: Culp, et al.
U.S. Appl. No. 10/004,549, filed Dec. 4, 2001. Inventors: Culp, et al.
U.S. Appl. No. 10/004,985, filed Dec. 3, 2001. Inventors: Culp, et al.
"Data Mining to Improve Energy Efficiency in Buildings", <http://www.knowledgeprocesssoftware.com/newweb/CounterDet>, (28 pages); Sep. 2001.

* cited by examiner

*Primary Examiner*—Albert W. Paladini
(74) *Attorney, Agent, or Firm*—Baker Botts L.L.P.

(57) ABSTRACT

A method for diagnostically evaluating energy consumption of a facility includes receiving energy consumption data associated with the facility, generating facility data associated with the facility, and receiving external variable data associated with the facility corresponding to the energy consumption data. The method also includes generating a first energy consumption model for the facility using the facility data, the energy consumption data, and the external variable data. The first energy consumption model corresponds to actual energy consumption of the facility. The method further includes generating a second energy consumption model for the facility using the facility data and the external variable data. The second energy consumption model corresponds to expected energy consumption of the facility. The method also includes diagnostically evaluating the energy consumption of the facility using the first and second energy consumption models.

39 Claims, 4 Drawing Sheets

SYSTEM AND METHOD FOR DIAGNOSTICALLY EVALUATING ENERGY CONSUMPTION SYSTEMS AND COMPONENTS OF A FACILITY

TECHNICAL FIELD OF THE INVENTION

This invention relates in general to the field of energy systems and, more particularly, to a system and method for diagnostically evaluating energy consumption systems and components of a facility.

BACKGROUND OF THE INVENTION

Schools, office buildings, homes, department stores, hospitals, and other types of facilities consume energy in varying amounts using a variety of different types of systems and components. For example, energy consumption systems and components may be used for environmental control, such as heating and cooling, for lighting, for security system applications, for computer usage applications, and for a variety of other energy consumption applications corresponding to the particular type of facility.

Because the types of facilities vary to a generally large degree, the energy usage associated with each type of facility also varies to a generally large degree. For example, energy consumption systems and components associated with homes are different than the energy consumption systems and components associated with an office building or hospital, and generally use less energy per unit of conditioned area than the systems and components of the office building or hospital.

Accordingly, because energy usage varies among different types of facilities, different energy consumption systems and components are designed to accommodate the various energy usage requirements of a particular facility. Additionally, in order to diagnostically evaluate particular energy consumption systems or components, information associated with the facility and the energy consumption systems and/or components must be determined, as well as the amount of energy used by the particular energy consumption systems and/or components. This information is also generally necessary to determine which energy consumption systems and/or components require repair, modification, or replacement. Obtaining the required information, however, generally requires access to the facility and/or the energy consumption systems and components. Accordingly, obtaining the required information is generally expensive and time-consuming.

SUMMARY OF THE INVENTION

Accordingly, a need has arisen for an improved system and method of diagnostically evaluating energy consumption systems and components associated with a variety of facilities. The present invention provides a system and method for diagnostically evaluating energy consumption systems and components for a variety of facilities that addresses shortcomings and disadvantages associated with prior systems and methods.

According to one embodiment of the present invention, a method for diagnostically evaluating energy consumption of a facility includes receiving energy consumption data associated with the facility, generating facility data associated with the facility, and receiving external variable data associated with the facility corresponding to the energy consumption data. The method also includes generating a first energy consumption model for the facility using the facility data, the energy consumption data, and the external variable data. The first energy consumption model corresponds to actual energy consumption of the facility. The method also includes generating a second energy consumption model for the facility using the facility data and the external variable data. The second energy consumption model corresponds to expected energy consumption of the facility. The method further includes diagnostically evaluating the energy consumption of the facility using the first and second energy consumption models.

According to another embodiment of the present invention, a system for energy consumption diagnostic evaluation of a facility includes a processor, a memory coupled to the processor, an energy consumption database accessible by the processor, a facility database accessible by the processor, and an external variable database accessible by the processor. The energy consumption database includes energy consumption data associated with the facility. The facility database includes facility data associated with the facility. The external variable database includes external variable data corresponding to the energy consumption data. The system also includes a configuration engine residing in the memory and executable by the processor. The configuration engine is operable to generate a first energy consumption model using the facility data, the energy consumption data, and the external variable data. The first energy consumption model corresponds to actual energy consumption of the facility. The configuration engine is further operable to generate a second energy consumption model using the facility data and the external variable data. The second energy consumption model corresponds to expected energy consumption of the facility. The system further includes an analysis engine residing in the memory and executable by the processor. The analysis engine is operable to diagnostically evaluate energy consumption of the facility using the first and second energy consumption models.

The present invention provides several technical advantages. For example, according to one embodiment of the present invention, actual and expected energy consumption models are generated for a facility. Based on the generated models, diagnostic evaluation of energy consumption systems and components of the facility may be performed. Additionally, the present invention may be used and implemented remotely from the facility.

Another technical advantage of the present invention includes determining operating parameters of energy consumption systems and/or components associated with a facility based on the diagnostic evaluation and determining whether modifications to the operating parameters should be performed based on the diagnostic evaluation. For example, after identifying and determining operating parameters of particular energy consumption systems and components of the facility, the diagnostic evaluation may be used to determine modifications to particular operating parameters of existing energy consumption systems and components of the facility to increase energy usage efficiency.

Other technical advantages are readily apparent to those skilled in the art from the following figures, descriptions, and claims.

BRIEF DESCRIPTION OF THE DRAWINGS

For a more complete understanding of the present invention, and the advantages thereof, reference is now made to the following description, taken in conjunction with the accompanying drawings, wherein like reference numerals represent like parts, in which.

DETAILED DESCRIPTION OF THE INVENTION

Figure 1:
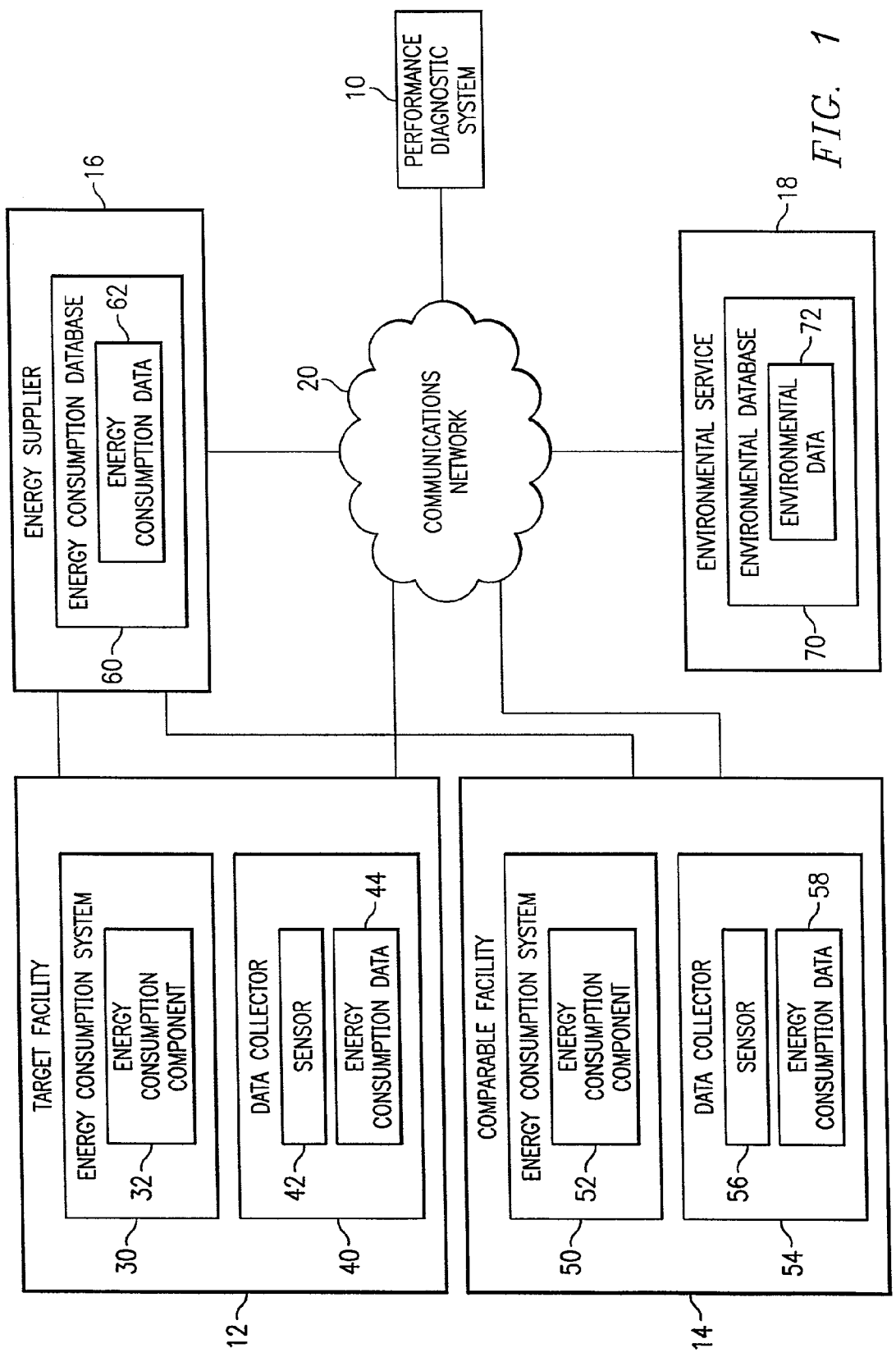
FIG. 1 is a block diagram illustrating a system for energy consumption diagnostic evaluation of a facility in accordance with an embodiment of the present invention.

FIG. 1 is a block diagram in which a performance diagnostic system 10 for diagnostically evaluating energy consumption of a facility in accordance with an embodiment of the present invention is illustrated. In the illustrated embodiment, system 10 is coupled to a target facility 12, a comparable facility 14, an energy supplier 16, and an environmental service 18 via a communications network 20. The communications network 20 may be different networks, or the same network, and may include any Internet, intranet, extranet, or similar communication network. The communications network 20 provides an electronic medium for transmitting and receiving information between the system 10 and facilities 12 and 14, the environmental service 18, and the energy supplier 16. However, other electronic and non-electronic modes of communication may also be used for transmitting and receiving information between the system 10 and the facilities 12 and 14, the environmental service 18, and the energy supplier 16.

The target facility 12 includes one or more energy consumption systems 30 such as, but not limited to, heating and cooling systems, lighting systems, computer systems, medical systems, product manufacturing systems, and/or a variety of other types of energy consumption systems. Accordingly, each energy consumption system 30 may include one or more discrete energy consumption components 32. For example, a heating/cooling energy consumption system 30 may include energy consumption components 32 such as boilers, heat exchangers, fans, compressors, and other related components. Accordingly, depending on the type of energy consumption system 30, the energy consumption components 32 relate to the function and operation of the particular energy consumption system 30.

The target facility 12 may also include one or more data collectors 40 each coupled to or disposed proximate to one or more of the energy consumption systems 30 and/or components 32. Each data collector 40 may also include or be coupled to a sensor 42 for determining energy consumption or usage corresponding to energy consumption systems 30 and the energy consumption components 32. For example, each sensor 42 may be coupled to or disposed proximate to a corresponding energy consumption component 32 and/or system 30 to acquire energy consumption or other information associated with the operation and efficiency of a particular energy consumption system 30 and/or component 32, such as, but not limited to, electrical usage, water flow rates, internal and external temperature data, internal and external humidity values, wind speed and direction, precipitation, and cloud conditions. Each sensor 42 may also include processing, memory, communication, and other functional capabilities for collecting, processing, manipulating, storing, and/or transmitting the acquired information associated with a particular energy consumption component 32 and/or system 30.

Each data collector 40 may also include processing, memory, communication, and other functional capabilities for receiving, manipulating, processing, storing and/or transmitting the energy consumption and other information acquired by the sensors 42. For example, each data collector 40 may receive, process and store energy usage and/or environmental information associated with a particular energy consumption system 30 and/or component 32 as energy consumption data 44. The energy consumption data 44 may then be shared between one or more other data collectors 40, transmitted to a central monitoring station, or otherwise stored, transferred and/or manipulated.

Comparable facility 14 is generally a structure having similar or comparable energy consumption features and/or characteristics as the target facility 12. For example, facilities 12 and 14 may both be a hospital, an office building, a department store, or other type of structure having similar energy usage characteristics such that the energy usage characteristics of the comparable facility 14 may be used to determine or approximate the energy usage characteristics for the target facility 12. As described above in connection with the target facility 12, the comparable facility 14 may also include one or more energy consumption systems 50 each comprising one or more energy consumption components 52. Also as described above in connection with the target facility 12, the comparable facility 14 may also include one or more data collectors 54, each data collector 54 comprising or coupled to one or more sensors 56. The data collectors 54 and sensors 56 may also be used to process and store energy usage information associated with the comparable facility 14 as energy consumption data 58.

The energy supplier 16 generally includes a utility company or one or more other providers of various energy services or products to businesses, homes, or other energy users, such as, but not limited to, electricity, gas, oil, or other energy services and products. The energy supplier 16 generally includes an energy consumption database 60 containing energy consumption data 62 associated with each of the facilities 12 and 14. The energy consumption data 62 may reflect energy usage as a function of time and expressed in a variety of different formats; however, the energy consumption data 62 may also include other energy-related information within the scope of the present invention.

The environmental service 18 comprises a weather service, meteorological service, or other service containing weather and/or environmental information, such as, but not limited to, the National Weather Service or other regional or local weather services or stations. The environmental service 18 generally includes an environmental database 70 containing environmental data 72 corresponding to particular periods of time and associated with the vicinity of the facilities 12 and/or 14. The environmental data 72 may include temperature data, humidity measurements, wind speed and direction, precipitation, cloud condition, and other environmental information that may affect energy usage or consumption during a particular period of time.

Briefly, the system 10 retrieves energy consumption information associated with the target facility 12 via the communications network 20 from the energy supplier 16 and/or directly from the target facility 12. The system 10 may also retrieve energy consumption information via the communications network 20 associated with the comparable facility 14 from the energy supplier 16 and/or directly from the comparable facility 14. Additionally, the system 10 retrieves environmental data 72 via the communications network 20 from the environmental service 18. Using the energy consumption information and the environmental data 72, the system 10 is used to diagnostically evaluate performance characteristics associated with the energy consumption systems 30 and/or components 32 of the target facility 12 and analyze various operating parameters of the energy consumption systems 30 and/or components 32. The system 10 is described in greater detail below in connection with FIGS. 2, 3A and 3B.

Figure 2:
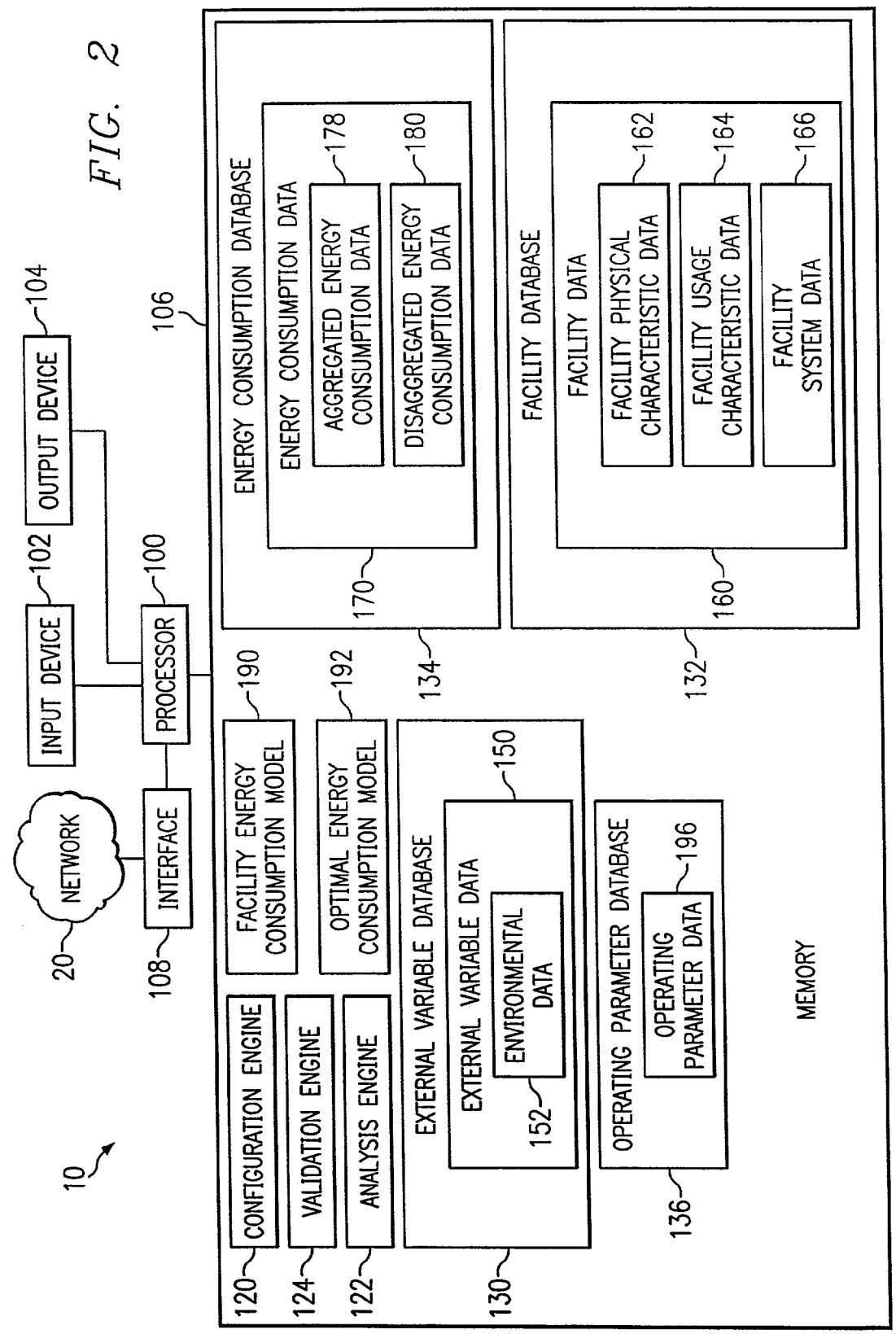
FIG. 2 is another block diagram illustrating the system for energy consumption diagnostic evaluation of a facility in accordance with an embodiment of the present invention.

FIG. 2 is a block diagram illustrating the system 10 in accordance with an embodiment of the present invention. In this embodiment, system 10 includes a processor 100, an input device 102, an output device 104, and a memory 106. The present invention also encompasses computer software that may be stored in memory 106 and executed by processor 100. The computer software may also be stored in a variety of other types of storage media including, but not limited to, floppy disk drives, hard drives, CD-ROM disk drives, or magnetic tape drives. Information, such as environmental data, energy usage data, or other types of information, may be received from a user of system 10 using a keyboard or any other type of input device 102. Output values or results may be output to a user of system 10 through output device 104, which may include a display, printer, or any other suitable type of output device. The system 10 may also include any suitable interface 108 for communicating via the communications network 20.

System 10 includes a configuration engine 120, an analysis engine 122 and a validation engine 124, which are computer software programs. In FIG. 2, the configuration engine 120, analysis engine 122 and validation engine 124 are illustrated as being stored in the memory 106, where they may be executed by the processor 100. However, the configuration engine 120, analysis engine 122 and validation engine 124 may also be stored on a variety of other types of storage media.

System 10 also includes an external variable database 130, a facility database 132, an energy consumption database 134, and an operating parameter database 136. In FIG. 2, the external variable database 130, facility database 132, energy consumption database 134, and operating parameter database 136 are illustrated as being stored in the memory 106, where they may be accessed by the processor 100. However, the databases 130, 132, 134, and 136 may also be stored on a variety of other types of storage media.

The external variable database 130 includes external variable data 150 associated with the target facility 12 and/or comparable facility 14. For example, the external variable data 150 may include environmental data 152 associated with the facilities 12 and 14. The environmental data 152 may include information associated with environmental conditions internal and external to the physical location of the facilities 12 and/or 14, such as temperature data, humidity, wind speed and direction, precipitation, cloud conditions, and other environment-related information. The environmental data 152 may be downloaded to the database 130 from the environmental service 18 via the communications network 20. The environmental data 152 may also be retrieved directly from the facilities 12 and/or 14 via the communications network 20. For example, as described above, the energy consumption data 44 and 58 associated with each of the respective facilities 12 and 14 may include information associated with the internal and external environmental conditions proximate to and affecting the operating parameters of the energy consumption systems 30 and 50 and/or components 32 and 52. It should be understood, however, that the environmental data 152 may be otherwise obtained and/or stored within the scope of the present invention.

The facility database 132 includes facility data 160 associated with the target facility 12 and/or comparable facility 14. For example, the facility data 160 may include facility physical characteristic data 162, facility usage characteristic data 164 and facility system data 166. The facility physical characteristic data 162 may include information corresponding to the physical features of target facility 12 or comparable facility 14, such as, but not limited to, the quantity of floors or levels, the square footage of each floor or level, whether the facility adjoins another structure, the architectural aspects of the facility, and the type of materials used in the construction of the facility.

The facility usage characteristic data 164 may include information associated with energy usage patterns and characteristics corresponding to the type of facility 12 and/or 14. For example, the facility usage characteristic data 164 may include information such as, but not limited to, whether the facility is a hospital, office building, department store, grocery store, home, or other type of facility, and the energy usage cycles and patterns associated with the type of facility, such as, but not limited to, periods of minimal or peak energy usage, the types of energy consumption systems and components generally used in corresponding types of facilities, whether one or more floors or levels of the facility incur greater energy usage than other levels or floors due to the energy usage applications generally found on the particular levels or floors, or other information associated with energy usage characteristics unique to the facility 12 and/or 14. For example, a hospital may experience a generally consistent energy usage pattern while an office building or department store may experience more cyclic energy usage patterns. Additionally, for example, in an office building application, one or more floors, or a portion of one or more floors, may be dedicated to computer server or network applications for providing computer services to various locations within the building. Accordingly, the floors or portions of floors containing the computer server and network applications may experience greater energy consumption than other floors of the building.

The facility system data 166 may include information corresponding to known energy consumption systems and/or components of the facilities 12 and/or 14. For example, all or a portion of the types of energy consumption systems and/or components of the facilities 12 and/or 14 may be known from either prior contact with the facilities 12 and/or 14, other facilities similar in size, structure or use applications as the facilities 12 and/or 14, or other sources of information.

The energy consumption database 134 includes energy consumption data 170 associated with the facility 12 and/or 14. The energy consumption data 170 may be downloaded via the communications network 20 from the energy supplier 16, the target facility 12, and/or the comparable facility 14. For example, the energy consumption data 62, the energy consumption data 44, and/or the energy consumption data 58 may be retrieved via the communications network 20 and stored in the energy consumption database 134 as the energy consumption data 170. However, the energy consumption data 170 may be otherwise received and stored within the scope of the present invention.

The energy consumption data 170 may include aggregated energy consumption data 178 and/or disaggregated energy consumption data 180 associated with the facility 12 and/or 14. The aggregated energy consumption data 178 generally includes energy usage information corresponding to the facilities 12 and/or 14 as a whole. The disaggregated energy consumption data 180 generally includes energy usage information corresponding to discrete systems 30, components 32, or types of energy used within and by the facilities 12 and 14. For example, the energy consumption data 44, 58 and 62 may include solely aggregated or disaggregated energy consumption information or a mixture of aggregated and disaggregated energy consumption information. The disaggregated energy consumption data 180 may be derived or extracted from the aggregated energy consumption information, as necessary, and stored in the energy consumption database 134.

In operation, the system 10 retrieves and stores the aggregated energy consumption data 178 and/or the disaggregated energy consumption data 180 from the energy supplier 16, the target facility 12, and/or the comparable facility 14. As described above, the aggregated energy consumption data 178 and the disaggregated energy consumption data 180 may be retrieved via the communications network 20 or other suitable electronic or non-electronic communication modes. The system 10 also retrieves and stores the external variable data 150 and the facility data 160 in a similar manner and as described above.

The analysis engine 122 may also be used to generate the facility data 160 using the aggregated energy consumption data 178 and/or the disaggregated energy consumption data 180. For example, the aggregated energy consumption data 178 and/or the disaggregated energy consumption data 180 may exhibit energy usage patterns generally associated with particular types of facilities and generally associated with particular sizes of facilities. Thus, the facility physical characteristic data 162 and facility usage characteristic data 164 may be derived from the aggregated energy consumption data 178 and/or the disaggregated energy consumption data 180.

The analysis engine 122 may further be used to generate and store the disaggregated energy consumption data 180 using the aggregated energy consumption data 178. For example, the analysis engine 122 may be used to generate the disaggregated energy consumption data 180 associated with the target facility 12 and/or the comparable facility 14 using the facility data 160, the aggregated energy consumption data 178, and the external variable data 150. For example, the aggregated energy consumption data 178 for particular periods or intervals of time and the environmental data 152 may be used to disaggregate the energy consumption information associated with the entire facility 12 and/or 14 where the energy consumption associated with the energy consumption components 32 or 52 may be additively combined. The analysis engine 122 may utilize heuristic and/or semi-empirical calculations to analyze the energy consumption of the energy consumption components 32 and 52 and to provide a mechanism for generating the disaggregated energy consumption data 180 from the aggregated energy consumption data 178. The analysis engine 122 may also use 1 parameter, 2 parameter, 3 parameter, 4 parameter, 5 parameter, change point multiple linear regression, or bin analysis techniques and calculations to analyze the energy consumption associated with the energy consumption components 32 and 52 to provide a mechanism for generating the disaggregated energy consumption data 180 from the aggregated energy consumption data 178. A weather-daytyping method for generating the disaggregated energy consumption data 180 may also be used by the analysis engine 122. For example, facilities using controlled sequencing of energy loads may be used to identify energy consumption levels of individual energy loads of consumption of the entire facility 12 and/or 14, combined with a 24-hour profile for generating the disaggregated energy consumption data 180. However, other methods may also be used to generate the disaggregated energy consumption data 180.

The validation engine 124 is used to validate the aggregated energy consumption data 178 and the disaggregated energy consumption data 180 to ensure that the aggregated and disaggregated energy consumption data 178 and 180 is complete and, therefore, not missing energy consumption information. For example, the aggregated and disaggregated energy consumption data 178 and 180 may include energy consumption information corresponding to specific time intervals or periods. The validation engine 124 determines whether energy consumption information is missing from the aggregated and disaggregated energy consumption data 178 and 180 and reconstructs the missing energy consumption information. For example, energy consumption data 58 from the comparable facility 14 may be retrieved and energy consumption information associated with particular time periods or intervals may be reconstructed from the energy consumption data 58 alone or in combination with the environmental data 152.

The configuration engine 120 is used to generate a facility energy consumption model 190 and an optimal energy consumption model 192 corresponding to the target facility 12. The facility energy consumption model 190 corresponds to a current or actual energy consumption configuration of the target facility 12. For example, the configuration engine 120 generates the model 190 using the aggregated or disaggregated energy consumption data 178 and 180 in combination with one or more of the environmental data 152, the facility physical characteristic data 162, the facility usage characteristic data 164, and the facility system data 166 to represent the energy consumption systems 30 and/or components 32 presently used by and contained within the target facility 12 and the energy consumption corresponding to the energy consumption systems 30 and/or components 32. Thus, the model 190 represents the current energy consumption configuration of the target facility 12. The configuration engine 120 may utilize energy balance rules, regression analysis, bin analysis, and other suitable techniques to derive and generate the models 190 and 192.

The optimal energy consumption model 192 corresponds to a configuration of the target facility 12 with energy consumption systems 30 and components 32 corresponding to optimal energy usage by the target facility 12. The optimal energy consumption model 192 may include the systems 30 and components 32 identified in the model 190 or may include other systems 30 and/or components 32 to maximize energy usage efficiency for the target facility 12. For example, the model 192 may include the systems 30 and components 32 of the model 190, thereby providing a comparison of actual energy consumption of the target facility 12 with energy consumption that would be expected by the target facility 12 using the same systems 30 and components 32 over a predetermined or common time period of the model 190. Thus, for example, the model 192 may be used to determine the expected energy consumption for the target facility 12 with the existing systems 30 and components 32 of the target facility 12 operating at various operating parameters and/or at peak operating efficiencies for the same time period corresponding to the model 190. Alternatively, the model 192 may include other or alternate systems 30 and/or components 32 configured for the target facility 12 which would provide a maximization of energy usage for the target facility 12. For example, the configuration engine 120 generates the model 192 using the aggregated or disaggregated energy consumption data 178 and 180 in combination with one or more of the environmental data 152, the facility physical characteristic data 162, and the facility usage characteristic data 164 to configure the target facility 12 with energy consumption systems 30 and components 32 to increase or optimize energy usage efficiency based on the environmental conditions within and surrounding the target facility 12 and the energy usage applications required by the target facility 12.

The configuration engine 120 may also be used to generate and store operating parameter data 196 in the operating parameter database 136. The operating parameter data 196 includes information associated with the operating parameters of the energy consumption systems 30 and/or components 32 of the target facility 12 based on the models 190 and/or 192. Additionally, the analysis engine 122 may be used to determine the operating efficiency of the systems 30 and/or components 32 of the target facility 12 for each of the models 190 and 192 using the operating parameter data 196. For example, using the environmental data 152, the facility data 160, the aggregated energy consumption data 178 and/or the disaggregated energy consumption data 180, the analysis engine 122 may determine the operating efficiency of the systems 30 and/or components 32 for each of the models 190 and 192.

Based on the generated models 190 and 192, systems 30 and components 32 of the target facility 12 may be diagnostically evaluated for energy consumption efficiency, operating parameter performance, and a variety of other energy consumption applications. For example, the systems 30 and components 32 contained in each of the models 190 and 192 may be compared to determine operating differences between the models 190 and 192 and to identify the systems 30 and components 32 requiring operating parameter modification, repair, or replacement.

Figure 3A:
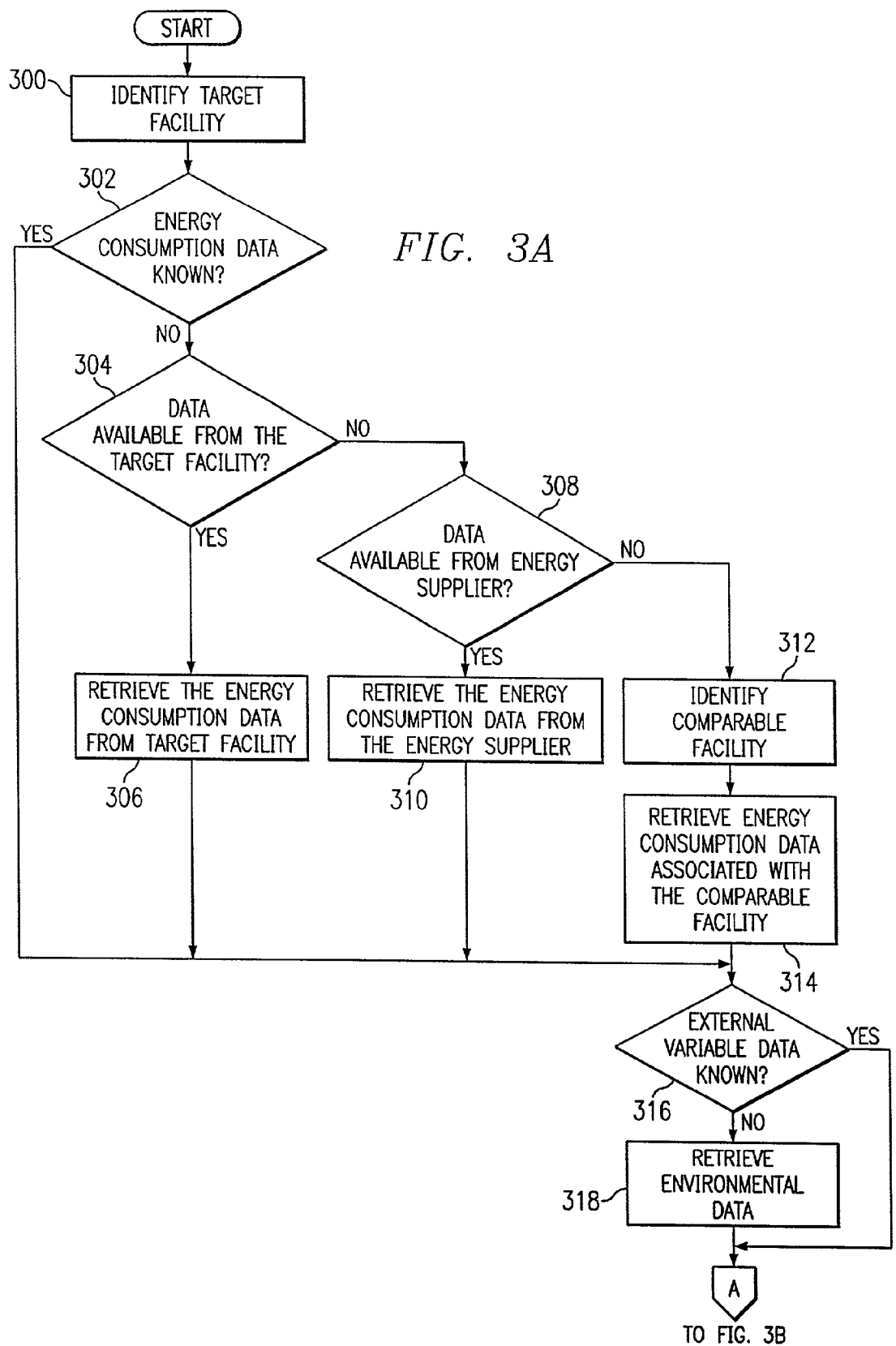
FIGS. 3A and 3B are flow charts illustrating a method of diagnostically evaluating energy consumption of a facility in accordance with an embodiment of the present invention.
Figure 3B:
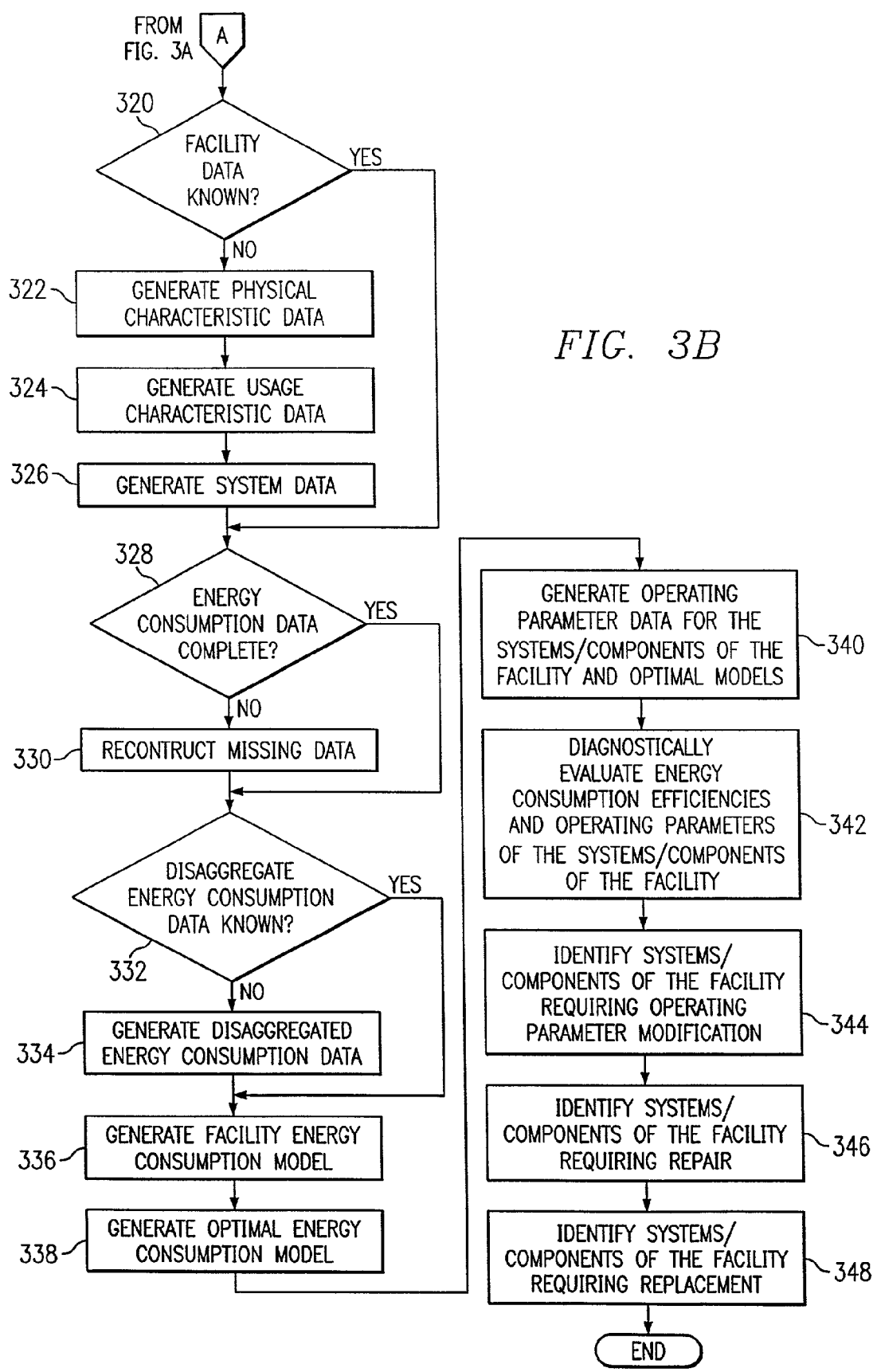

FIGS. 3A and 3B are flow charts illustrating a method for energy consumption diagnostic evaluation of energy consumption systems 30 and/or components 32 of the target facility 12 in accordance with an embodiment of the present invention. The method begins at step 300, where a target facility 12 is identified. At decisional step 302, a determination is made whether energy consumption data 170 for the target facility 12 is known. If the energy consumption data 170 for the target facility 12 is known, the method proceeds from step 302 to step 316. If the energy consumption data 170 for the target facility 12 is unknown, the method proceeds from step 302 to decisional step 304, where a determination is made whether the energy consumption data 44 is available directly from the target facility 12. If the energy consumption data 44 is available directly from the target facility 12, the method proceeds from step 304 to step 306, where the energy consumption data 44 may be retrieved from the data collector 40 of the target facility 12 via the communications network 20 and stored as the energy consumption data 170 in the form of aggregated energy consumption data 178 and/or disaggregated energy consumption data 180 in the energy consumption database 134.

If the energy consumption data 44 is not available directly from the target facility 12, the method proceeds from step 304 to decisional step 308, where a determination is made whether the energy consumption data 62 is available from the energy supplier 16. If the energy consumption data 62 is available from the energy supplier 16, the method proceeds from step 308 to step 310, where the energy consumption data 62 associated with the target facility 12 is retrieved via the communications network 20 and stored as the energy consumption data 170 in the form of aggregated energy consumption data 178 and/or disaggregated energy consumption data 180 in the energy consumption database 134.

If the energy consumption data 62 associated with the target facility 12 is not available from the energy supplier 16, the method proceeds from step 308 to step 312, where a comparable facility 14 is identified. At step 314, energy consumption data 170 associated with the comparable facility 14 is retrieved. For example, as described above in connection with the target facility 12, the energy consumption data 58 may be retrieved directly from the comparable facility 14 via the communications network 20, or the energy consumption data 62 associated with the comparable facility 14 may be retrieved from the energy supplier 16 via the communications network 20. However, as described above, energy consumption data 58 or 62 associated with the comparable facility 14 may be otherwise retrieved and stored as the energy consumption data 170.

At decisional step 316, a determination is made whether the external variable data 150 associated with either the target facility 12 or the comparable facility 14 is known. If the external variable data 150 is known, the method proceeds from step 316 to step 320. If the external variable data 150 is unknown, the method proceeds from step 316 to step 318, where the environmental data 152 is retrieved from the environmental service 18 via the communications network 20 corresponding to the facilities 12 and/or 14. For example, the environmental data 72 may be retrieved via the communications network 20 and stored as the environmental data 152 within the external variable database 130. Additionally, as described above, the energy consumption data 44 and 58 may also contain information associated with the internal and external environmental conditions of the respective facilities 12 and 14. Thus, the environmental information contained within the data 44 and 58 may be extracted and stored as the environmental data 152. However, as described above, the environmental data 152 may be otherwise retrieved and stored within the scope of the present invention.

At decisional step 320, a determination is made whether the facility data 160 associated with the target facility 12 is known. If the facility data 160 is known, the method proceeds from step 320 to step 328. If the facility data 160 associated with the target facility 12 is unknown, the method proceeds from step 320 to step 322, where the facility physical characteristic data 162 is generated for the target facility 12. For example, facility physical characteristic data 162 associated with the target facility 12 may be stored within the facility database 132, such as the size of the target facility 12, the quantity of floors or levels of the target facility 12, and other information associated with the physical characteristics of the target facility 12.

At step 324, the facility usage characteristic data 164 associated with the target facility 12 is generated and stored within the facility database 132. For example, the usage characteristic data 164 may include information such as whether the target facility 12 is a hospital, business, home, or other type of facility generally indicating energy consumption patterns associated with a particular type of target facility 12. At step 326, the facility system data 166 is generated and stored within the facility database 132.

At decisional step 328, a determination is made whether the energy consumption data 170 is complete. For example, the energy consumption data 170 may be incomplete such that energy consumption information is missing or is unavailable for various time periods or intervals. If the energy consumption data 170 is complete, the method proceeds from step 328 to step 332. If the energy consumption data 170 is incomplete, the method proceeds from step 328 to step 330, where the validation engine 124 is used to reconstruct the missing data. For example, as described above, the missing energy consumption information may be reconstructed using energy consumption data 58 associated with a comparable facility 14 in combination with the environmental data 152. Alternatively, the validation engine 124 may also use the energy consumption data 170 associated with the target facility 12 corresponding to other similar environmental conditions for other predetermined time periods or intervals to generate the missing energy consumption information.

At decisional step 332, a determination is made whether disaggregated energy consumption data 180 is known. If the disaggregated energy consumption data 180 is known, the method proceeds from step 332 to step 336. If the disaggregated energy consumption data 180 is not known, the method proceeds to step 334, where the disaggregated energy consumption data 180 is generated for the target facility 12 using the aggregated energy consumption data 178, the external variable data 150, and the facility data 160.

At step 336, the configuration engine 120 generates the facility energy consumption model 190 using the energy consumption data 170, the facility data 160, and the external variable data 150. At step 338, the configuration engine 120 generates the optimal energy consumption model 192 for the target facility 12. As described above, the model 192 may be configured having the systems 30 and components 32 of the model 190 or may be configured having alternate systems 30 and/or components 32 that may provide for energy usage optimization for the target facility 12. At step 340, operating parameter data 196 is generated for the systems 30 and components 32 of the models 190 and 192. As described above, after generation of the models 190 and 192 and the operating parameter data 196, efficiency and operating parameter comparisons can be made between the systems 30 and the components 32 of the models 190 and 192.

At step 342, the models 190 and 192 and/or the operating parameter data 196 may be used to diagnostically evaluate the energy consumption efficiencies of the systems 30 and components 32 of the target facility 12. For example, as described above, the model 192 may be configured with the systems 30 and components 32 of the model 190, thereby providing a comparison of the actual and expected energy consumption of the systems 30 and components 32 and operating parameter differences between the systems 30 and components 32 of the models 190 and 192 for predetermined time periods. At step 344, a comparison of the models 190 and 192 and/or the operating parameter data 196 may be used to identify systems 30 and/or components 32 of the target facility 12 requiring operating parameter modification. For example, as described above, operating parameters of the systems 30 and components 32 of the target facility 12 may be diagnostically evaluated using the models 190 and 192 to determine if increased efficiency may be obtained by modifying the operating parameters of specific systems 30 and/or components 32 of the target facility 12.

At step 346, a comparison of the models 190 and 192 and/or the operating parameter data 196 may be used to identify systems 30 and/or components 32 of the target facility 12 requiring repair. For example, if the models 190 and 192 are configured having the same systems 30 and components 32, a comparison of the models 190 and 192 and/or the operating parameter data 196 may indicate that particular systems 30 and/or components 32 of the target facility 12 are in need of repair to achieve proper and cost effective operation. At step 348, a comparison of the models 190 and 192 and/or the operating parameter data 196 may be used to identify systems 30 and/or components 32 of the target facility 12 requiring replacement. For example, if the model 192 is configured having systems 30 and/or components 32 providing optimum energy consumption for the target facility 12, a comparison of the models 190 and 192 may indicate that replacement of the existing systems 30 and/or components 32 of the target facility 12 may be required to obtain optimum energy usage for the target facility 12.

Thus, the present invention provides a system 10 for diagnostically evaluating the energy consumption systems and components of a facility. The system 10 may be used remotely from a facility and without accessing or visiting the particular facility, thereby substantially reducing or eliminating the costs and time associated with site visits to facilities to obtain the required energy usage information for the facility. The system 10 may further be used to diagnostically evaluate existing energy consumption system and component operating parameters as well as diagnostically evaluate the existing systems and components of the facility with alternate systems and components that may provide increased energy usage efficiency.

Although the present invention has been described in detail, various changes and modifications may be suggested to one skilled in the art. It is intended that the present invention encompass such changes and modifications as falling within the scope of the appended claims.

What is claimed is:

1. A method for diagnostically evaluating energy consumption of a facility, comprising:
    receiving energy consumption data associated with the facility;
    generating facility data associated with the facility;
    receiving external variable data associated with the facility corresponding to the energy consumption data;
    generating a first energy consumption model for the facility using the facility data, the energy consumption data, and the external variable data, the first energy consumption model corresponding to actual energy consumption of the facility;
    generating a second energy consumption model for the facility using the facility data and the external variable data, the second energy consumption model corresponding to expected energy consumption of the facility; and
    diagnostically evaluating the energy consumption of the facility using the first and second energy consumption models.

2. The method of claim 1, further comprising validating the energy consumption data.

3. The method of claim 2, wherein validating the energy consumption data comprises:
    analyzing the energy consumption data for missing data; and
    reconstructing the missing data.

4. The method of claim 3, wherein reconstructing the missing data comprises:
    identifying a comparable facility;
    retrieving energy consumption data associated with the comparable facility; and
    reconstructing the missing data for a specified time period using the energy consumption data associated with the comparable facility.

5. The method of claim 1, wherein receiving the energy consumption data comprises receiving the energy consumption data from an energy consumption database of an energy supplier.

6. The method of claim 1, wherein receiving the energy consumption data comprises receiving the energy consumption data from a data collector disposed at the facility.

7. The method of claim 1, wherein generating the facility data comprises generating the facility data using the energy consumption data.

8. The method of claim 1, wherein generating the facility data comprises generating the facility data using physical characteristic data associated with the facility.

9. The method of claim 1, wherein receiving the energy consumption data comprises receiving the energy consumption data remote from the facility.

10. The method of claim 1, further comprising identifying an energy consumption system of the facility using the first energy consumption model, and wherein generating the facility data comprises generating the facility data based on the energy consumption component.

11. The method of claim 1, wherein receiving the external variable data comprises receiving environmental data corresponding to the energy consumption data.

12. The method of claim 11, further comprising validating the environmental data.

13. The method of claim 1, wherein diagnostically evaluating comprises:
determining energy usage for the facility based on the second energy consumption model; and
comparing the energy usage based on the second energy consumption model with the energy consumption data.

14. The method of claim 1, further comprising:
identifying a comparable facility; and
retrieving energy consumption data associated with the comparable facility; and
wherein generating the first energy consumption model further comprises generating the first energy consumption model using the energy consumption data associated with the comparable facility.

15. The method of claim 1, further comprising determining a modification of an operating parameter of an energy consumption system of the facility using the second energy consumption model.

16. The method of claim 1, further comprising determining whether a change of an energy consumption system of the facility is required based on the diagnostic evaluation, the change selected from the group consisting of a repair, a modification, and a replacement.

17. The method of claim 1, wherein generating the facility data comprises:
generating physical characteristic data corresponding to the facility;
generating energy usage characteristic data associated with the facility; and
generating system data associated with the facility.

18. The method of claim 1, wherein receiving the energy consumption data comprises:
receiving aggregated energy consumption data associated with the facility; and
generating disaggregated energy consumption data associated with the facility using the aggregated energy consumption data.

19. The method of claim 1, wherein generating the facility data comprises:
generating physical characteristic data associated with the facility; and
generating energy usage characteristic data associated with the facility.

20. A system for energy consumption diagnostic evaluation of a facility, comprising:
a processor;
a memory coupled to the processor;
an energy consumption database accessible by the processor, the energy consumption database having energy consumption data associated with the facility;
a facility database accessible by the processor, the facility database having facility data associated with the facility;
an external variable database accessible by the processor, the external variable database having external variable data corresponding to the energy consumption data;
a configuration engine residing in the memory and executable by the processor, the configuration engine operable to generate a first energy consumption model using the facility data, the energy consumption data, and the external variable data, the first energy consumption model corresponding to actual energy consumption of the facility, the configuration engine further operable to generate a second energy consumption model using the facility data and the external variable data, the second energy consumption model corresponding to expected energy consumption of the facility; and
an analysis engine residing in the memory and executable by the processor, the analysis engine operable to diagnostically evaluate energy consumption of the facility using the first and second energy consumption models.

21. The system of claim 20, further comprising a validation engine residing in the memory and executable by the processor, the validation engine operable to validate the energy consumption data.

22. The system of claim 21, wherein the validation engine is operable to analyze the energy consumption data for missing data and, in response to determining that missing data exists, reconstruct the missing data.

23. The system of claim 20, wherein the energy consumption data comprises energy consumption data residing in an energy consumption database of an energy supplier.

24. The system of claim 20, wherein the energy consumption data comprises:
aggregated energy consumption data associated with the facility; and
disaggregated energy consumption data associated with discrete energy consumption systems of the facility.

25. The system of claim 24, wherein the analysis engine is further operable to generate the disaggregated energy consumption data from the aggregated energy consumption data.

26. The system of claim 20, wherein the facility data is generated based on the energy consumption data.

27. The system of claim 20, wherein the facility data comprises physical characteristic data associated with the facility.

28. The system of claim 27, wherein the facility data further comprises energy usage characteristic data associated with the facility.

29. The system of claim 28, wherein the facility data further comprises system data associated with the facility, the system data indicating a present energy consumption system of the facility.

30. The system of claim 20, wherein the external variable data comprises environmental data corresponding to the energy consumption data.

31. The system of claim 30, further comprising a validation engine residing in the memory and executable by the processor, the validation engine operable to validate the environmental data.

32. The system of claim 20, wherein the analysis engine is further operable to determine a modification to an operating parameter of an energy consumption system of the facility based on the diagnostic evaluation.

33. The system of claim 32, wherein the analysis engine is further operable to identify an energy consumption component of the energy consumption system.

34. The system of claim 33, wherein the analysis engine is further operable to determine whether a repair of the energy consumption component is required based on the diagnostic evaluation.

35. The system of claim 33, wherein the analysis engine is further operable to determine whether a replacement of the energy consumption component is required based on the diagnostic evaluation.

36. The system of claim 20, wherein the energy consumption data comprises energy consumption data retrieved from a data collector disposed at the facility.

37. The system of claim 20, wherein the analysis engine is further operable to determine operating parameter data for an energy consumption system of the facility corresponding to each of the first and second models.

38. The system of claim 20, wherein the energy consumption data comprises energy consumption data associated with a comparable facility.

39. The system of claim 20, wherein the analysis engine is further operable to generate operating parameter data associated with an energy consumption system of the facility corresponding to each of the first and second energy consumption models.

* * * * *